Oct. 29, 1963  W. SIPOS  3,108,391
INSECT TRAP

Filed May 9, 1961  2 Sheets-Sheet 1

Walter Sipos
    INVENTOR.

BY *Clarence A. O'Brien*
   *and Harvey B. Jacobson*
                    Attorneys Oct. 29, 1963 W. SIPOS 3,108,391
INSECT TRAP
Filed May 9, 1961 2 Sheets-Sheet 2
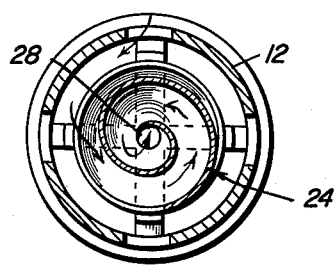
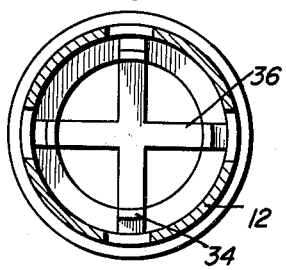
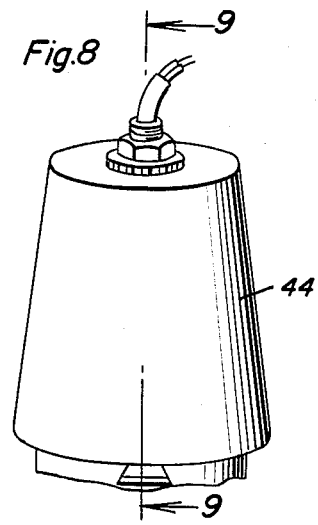
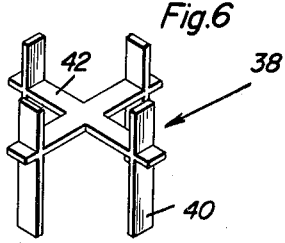
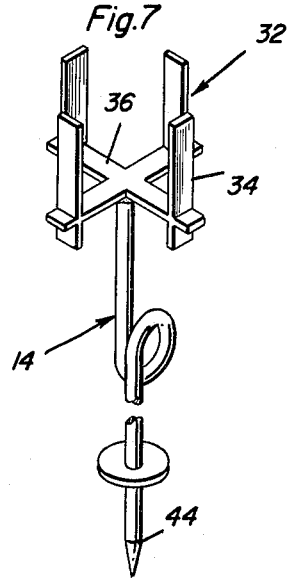
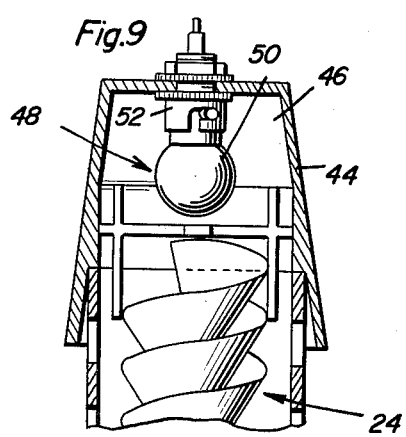
Walter Sipos
INVENTOR.

United States Patent Office 3,108,391
Patented Oct. 29, 1963

3,108,391
INSECT TRAP
Walter Sipos, Albany, N.Y., assignor of forty percent to Mary C. Ackerman, Albany, N.Y.
Filed May 9, 1961, Ser. No. 108,892
10 Claims. (Cl. 43—113)

This invention relates to a new and useful device utilized in connection with an insecticide coating for attracting and trapping of insects both inside and outside of dwellings.

It is therefore a primary object of the present invention, to provide a trap that will attract and trap therewithin all types and sizes of insects for prolonged contact with an insecticide and subsequent discharge of poisoned insects so that the device remains effective for its purpose for an extended period of time without replacement.

Another object of this invention is to provide a device that may be installed in a vertical position either inside or outside a dwelling for the purpose of attracting insects therewithin which will alight upon a spiralling surface coated with insecticides so that the insect as a result of prolonged contact with the insecticide will fall through central passages within the spiral surface and through a central aperture in the bottom of the housing for collection and disposal.

A further object of this invention is to provide an insect attracting and trapping device which comprises a multi-colored outer tubular housing having an imperforate roof thereon and apertures of different sizes and shape below the roof for receiving insects of different sizes and shape. Mounted within the tubular housing in spaced relation to the upper and lower ends of the housing and in spaced relation to the side walls thereof, is a spiral conical configuration forming a continuous surface that may be coated with an insecticide poison. Insects entering the apertures in the tubular housing will accordingly alight upon the spiral surface and when overcome by the insecticide will drop downwardly therethrough and out the lower end of the housing through an aperture provided for such purpose.

In accordance with the foregoing objects, the device of the present invention may be made of a construction which is readily assembled requiring a minimum of parts each of which may be readily replaced when worn. Accordingly, the outer tubular housing has removably connected to the lower end thereof, a centrally apertured cap member to which a mounting member may extend for connection to a spacer element axially positioned at the lower end of the tubular housing by the cap member. The inner spiralled surface member which is coated with the insecticide substance, may therefore be received upon the lower spacer member for the purpose of positioning said inner spiral surface element in spaced relation to the walls of the tubular housing member above the lower spacer element. A roof cap member may then be positioned on top of the tubular housing member above an upper spacer element. The inner spiral surface member may also be multi-colored like the tubular housing member for attracting insects. Also, as an optional feature of the present invention, the upper roof cap member may contain a source of illumination whereby insects may be attracted at night when the multi-color appearance of the device would have no effect on insects.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a sectional view taken through a plane indicated by section line 4—4 in FIGURE 2.

FIGURE 5 is a sectional view taken through a plane indicated by section line 5—5 in FIGURE 2.

FIGURE 6 is a perspective view of the upper spacer element of the insect trap device.

FIGURE 7 is a perspective view of the lower spacer and mounting assembly of the insect trap device.

FIGURE 8 is a perspective view of the upper portion of a modified form of insect trap device made in accordance with the present invention.

FIGURE 9 is a sectional view taken substantially through a plane indicated by section line 9—9 of FIGURE 8.

Figure 1:
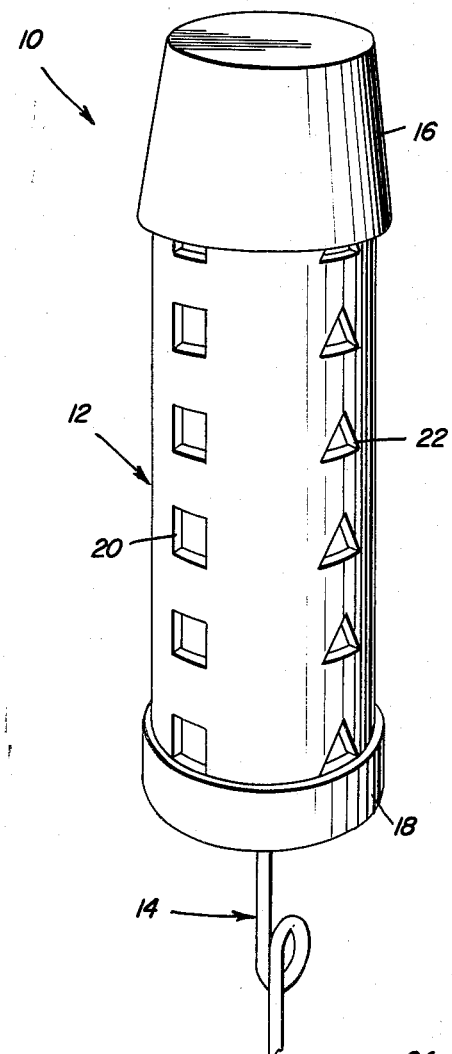
FIGURE 1 is a perspective view of the insect trap device of the present invention.

Referring now to the drawings in detail, it will be observed from FIGURE 1, that the insect device generally referred to by reference numeral 10 is vertically positioned exposing an outer tubular housing 12 mounted in any suitable manner above the ground by a mounting stem 14. The tubular housing 12 includes an imperforate roof cap 16 which closes and overhangs the upper end of the tubular housing 12. The lower end of the housing 12 is capped by a lower apertured cap member 18 through which the mounting stem 14 extends. The tubular housing 12 may be multi-colored for attracting different types of insects while the actual shape of the roof cap member 16 may be varied in accordance with the decor of the dwelling with which the device 10 may be associated. It will therefore be apparent, that the device 10 of the present invention may provide a pleasant appearance despite its distasteful yet necessary function.

Figure 2:
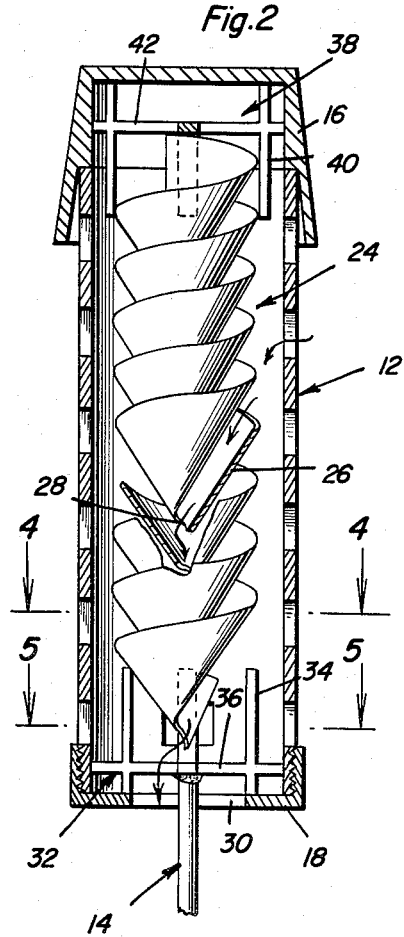
FIGURE 2 is a longitudinal sectional view taken through the insect trap device illustrated in FIGURE 1 with parts shown in section.
Figure 3:
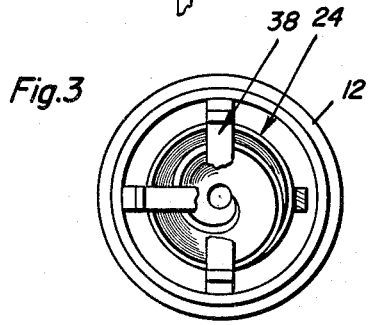
FIGURE 3 is a top plan view of the insect trap device with the roof cap member removed.

The outer tubular housing 12 is imperforate except for the plurality of series of vertically spaced apertures such as the square apertures 20 and the triangular apertures 22. Insects of different types and sizes are therefore receivable through the apertures when attracted and may thereby alight upon a multi-colored continuous imperforate non-adhesive surface element generally referred to by reference numerals 24 which extends throughout the housing 12 so that a receiving surface will be immediately presented to an insect entering any of the apertures in thte housing. As more clearly seen in FIGURE 2, the element 24 is formed of a plastic sheet material which is twisted into a conical or funnel-like spiral configuration forming spaced downwardly sloping walls 26 defining a central axial passage 28. The walls 26 may be coated with a non-adhesive insecticide substance which also has an aroma that attracts insects. Insects entering through the apertures 20 and 22 will therefore alight upon the surface of the elements 24 and be guided along the spiral path thereof either upwardly or downwardly by virtue of the imperforate and continuous nature of the walls 26 and the non-adhesive property of the insecticide. Accordingly, the surface presented by the spiral element 24 will be an ideal poison contact surface inasmuch as its continuous surface may be coated with insecticide for prolonged contact with the insect. Once the insect has been overcome, the conical formation of the wall 26 will direct the fall of the insects downwardly through the central passage 28 and out the central discharge aperture 30 within the lower cap member 18 which is removably attached to the lower end of the tubular housing member 12 in any suitable manner such as by screw threads as illustrated.

In order to be effective for its purpose, the inner elements 24 must necessarily be spaced throughout from the walls of the tubular housing 12 so as to prevent escape of the insect from the element 24 once it has alighted thereon. A lower spacer element as more clearly seen in FIGURE 7, generally referred to by reference numeral 32, is connected to the upper ends of the mounting stem elements 14 as by welding, the spacer element 32 being positioned within the lower cap member 18 as more clearly seen in FIGURE 2. The spacer element includes a plurality of upwardly projecting arms 34 interconnected by the horizontal cross member 36 in spaced relation to the inner side walls of the tubular housing 12 and in spaced relation above the central aperture 30. Accordingly, the lower end of the element 24 may be received between the arms 34 of the lower spacer element 32 in order to hold said lower end of the element 24 in spaced relation to the walls of the housing. The upper end of the element 24 is similarly spaced from the walls of the housing and the roof cap member 16 by an upper spacer element generally referred to by reference numeral 38 which is more clearly seen in FIGURE 6. The upper spacer element 38 also includes a plurality of vertical arms 40 interconnected by a horizontal cross member 42 for positioning and spacing the upper end of the spiral surface element 24. The upper spacer element 38 may therefore be positioned within the roof cap member 16 and shown in FIGURE 2 for projection downwardly into the upper end of the tubular housing 12. The roof cap member 16 as hereinbefore indicated closes the upper end of the tubular housing 12 and may further serve as a rain deflecting member should the device 10 be mounted above the ground outside of a dwelling.

From the foregoing description, it will be apparent, that a pleasant appearing device 10 is provided which may be mounted in spaced relation above the ground by a stem element 14, the lower end 44 of which may be anchored in the ground as shown in FIGURE 7. The device may also be readily assembled and disassembled for replacement of parts. Accordingly, the lower spacer element 32 connected to the mounting stem 14 may be received within the lower cap member 18 after which the tubular housing member 12 may be threadedly connected thereto followed by the insertion from above of the spiral path element 24 for reception between the arms 34 of the lower spacer element 32. The roof cap member 16 with the upper spacer element 38 seated therein may then be applied to the upper end of the housing member 12 in order to complete the assembly. By virtue of the multi-coloring of the tubular housing 12 and the spiral surface element 24 as well as the aroma admitted through the apertures of the tubular housing 12, insects will be attracted to the device 10 and enter through the apertures for subsequent alighting on the non-adhering surface wall of the element 24. The insect will then be trapped by being directed in a spiral path along the element 24 and thereby be in prolonged contact with the insecticide which coats the walls of the element 24. When the insects are overcome they will therefore drop through the central passage 28 in the element 24 and finally be discharged through the lower aperture 30 in the cap member 18. The insects will therefore be collected around the mounting stem on the ground below the device 10 where the device is mounted outside of a dwelling. When mounted inside of the dwelling either by a stand or by hanging, the device may be utilized with a collecting pan provided therebelow for receiving insects for disposal periodically when the pan has become sufficiently covered with dead insects.

FIGURES 8 and 9 illustrate a modification of the insect trap device hereinbefore described. In the modified form, the roof cap member may be axially enlarged so as to form a roof cap member 44 which serves the same function as hereinbefore described with respect to the roof cap member 16 but also provides an upper space 46 within which an illumination device 48 is received. The device 48 may therefore be in the form of an electric light bulb 50 received within a socket device 52 mounted in the upper end of the roof cap member 44 for electrical connection in any suitable manner to a source of current. Accordingly, the insect trap device may be useful at night time when the multi-coloring effect thereof would be reduced, by providing the additional light attraction for insects.

From the foregoing description, operation and utility of the insect attracting and trapping device of the present invention will be apparent. It will therefore also be apparent, that a device is provided which in addition to its high effectiveness for eliminating the nuisance of insects both within and outside of dwellings, will also present a pleasing appearance and may be economically manufactured and assembled and disassembled for replacement of the element 24 for example, when the insecticide coating becomes exhausted. Disassembly or displacement of the insect trap for removal of dead insects is, however, avoided in view of the continuous discharge of the insects into the central passage 28 and out the outlet opening 30 at the bottom axial end of the tubular housing 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An insect trap comprising, housing means having opposite ends and apertures for receiving insects therethrough, continuous imperforate surface directing means having a non-adhesive coating of insecticide and extending throughout the housing means internally thereof between said opposite ends for inducing movement of insects received thereon between said ends of the housing means, outlet means disposed at one of said ends of the housing means for continuously discharging insects, poisoned by prolonged contact with said insecticide on said surface directing means so as to succumb to the force of gravity, a pair of spacers mounted within said housing means at said opposite ends respectively for supporting the surface directing means in confronting spaced relation to said apertures in the housing means, and an imperforate roof member removably mounted at the other of said opposite ends of the housing means enclosing one of said spacers positioned therein, said surface directing means having upper and lower axial ends, said upper axial end being enclosed by the roof member, said outlet means comprising a centrally apertured cap member axially positioning one of said spacers for receiving said lower end of the surface directing means adjacent said one end of the housing means.

2. The combination of claim 1, wherein said surface directing means is a conical spiral configuration having spaced downwardly sloping walls defining a central passage and said insecticide has insect attracting properties.

3. The combination of claim 2, wherein said housing means and surface directing means are multi-colored.

4. The combination of claim 3, including illumination means mounted within said roof member.

5. An insect trap comprising, housing means having opposite ends and apertures for receiving insects therethrough, continuous imperforate surface directing means having a non-adhesive insecticide coating disposed within the housing means extending between said opposite ends thereof for inducing movement of insects therealong between said opposite ends of the housing means, and outlet means disposed at one of said ends of the housing means for receiving a gravity induced flow of insects poisoned by prolonged contact with said insecticide coating on said surface directing means, a pair of spacer means mounted within said housing means at said opposite ends thereof for supporting the surface directing means in confronting spaced relation to the apertures in the housing means throughout, said outlet means comprising a centrally apertured cap member axially positioning one of said spacer means for receiving a lower end of the surface directing means adjacent said one end of the housing means.

6. An insect trap comprising, housing means having opposite ends and apertures for receiving insects therethrough, continuous imperforate surface directing means having a non-adhesive coating of insecticide and extending throughout the housing means internally thereof between said opposite ends for inducing movement of insects received thereon between said ends of the housing means, an outlet means disposed at one of said ends of the housing means for continuously discharging insects poisoned by prolonged contact with said insecticide on said surface directing means so as to succumb to the force of gravity, said surface directing means being constituted by a conical spiral configuration having spaced downwardly sloping walls defining a central passage and said insecticide having insect attracting properties.

7. The combination of claim 1, including illumination means removably mounted on the housing means within said roof member.

8. An insect trap comprising, enclosure means having spaced inlet apertures for receiving insects therethrough, imperforate surface means mounted within said enclosure means in spaced relation thereto for providing a continuous guided path presented to insects entering any of said apertures, a non-adhesive insecticide coating said surface means for prolonged contact with insects alighting on and guided along said surface means, and continuous discharge means operatively located relative to said surface means within the enclosure means for receiving insects deviating under the influence of gravity from the guided path provided by the surface means when overcome by the effects of the insecticide, said surface means comprising, a spiral formation defining vertically spaced funnel-like walls inclined downwardly toward said continuous discharge means forming insect receiving surfaces on opposite sides thereof.

9. The combination of claim 8, wherein said continuous discharge means comprises, an axial passage defined centrally within said surface means and in continuous communication therewith, and an outlet opening formed at one end of said enclosure means in axial alignment with said passage.

10. An insect trap comprising, enclosure means having spaced inlet apertures for receiving insects therethrough, imperforate surface means mounted within said enclosure means in spaced relation thereto for providing a continuous guided path presented to insects entering any of said apertures, a non-adhesive insecticide coating said surface means for prolonged contact with insects alighting on and guided along said surface means, and continuous discharge means operatively located relative to said surface means within the enclosure means for receiving insects deviating under the influence of gravity from the guided path provided by the surface means when overcome by the effects of the insecticide, said continuous discharge means comprising, an axial passage defined centrally within said surface means and in continuous communication therewith, and an outlet opening formed at one end of said enclosure means in axial alignment with said passage.

References Cited in the file of this patent

UNITED STATES PATENTS

| | | |
|---|---|---|
| 330,033 | Manning | Nov. 10, 1885 |
| 869,556 | De Haas | Oct. 29, 1907 |
| 1,031,889 | Thieme | July 9, 1912 |
| 1,086,259 | Yost | Feb. 3, 1914 |
| 1,482,420 | Wilson | Feb. 5, 1924 |
| 1,833,699 | Wolf | Nov. 24, 1931 |
| 2,157,449 | Berg | May 9, 1939 |

FOREIGN PATENTS

| | | |
|---|---|---|
| 422,209 | France | Jan. 13, 1911 |